(12) United States Patent
Chesla

(10) Patent No.: US 11,115,437 B2
(45) Date of Patent: Sep. 7, 2021

(54) CYBER-SECURITY SYSTEM AND METHODS THEREOF FOR DETECTING AND MITIGATING ADVANCED PERSISTENT THREATS

(71) Applicant: Cybereason Inc., Boston, MA (US)

(72) Inventor: Avi Chesla, Tel Aviv (IL)

(73) Assignee: Cybereason Inc., Boston, MA (US)

( * ) Notice: Subject to any disclaimer, the term of this patent is extended or adjusted under 35 U.S.C. 154(b) by 360 days.

(21) Appl. No.: 14/799,954

(22) Filed: Jul. 15, 2015

(65) Prior Publication Data

US 2016/0057166 A1 Feb. 25, 2016

Related U.S. Application Data

(60) Provisional application No. 62/085,844, filed on Dec. 1, 2014, provisional application No. 62/026,393, filed on Jul. 18, 2014.

(51) Int. Cl.
*H04L 29/06* (2006.01)
*G06F 21/56* (2013.01)
*G06F 21/55* (2013.01)

(52) U.S. Cl.
CPC ............ *H04L 63/20* (2013.01); *G06F 21/552* (2013.01); *G06F 21/56* (2013.01); *H04L 63/02* (2013.01); *H04L 63/14* (2013.01); *H04L 63/145* (2013.01); *H04L 63/1416* (2013.01); *H04L 63/1441* (2013.01); *H04L 63/1483* (2013.01)

(58) Field of Classification Search
CPC ............ H04L 63/0263; H04L 63/1408; H04L 63/1441; H04L 63/1425; H04L 63/1416; H04L 63/1483
See application file for complete search history.

(56) References Cited

U.S. PATENT DOCUMENTS

| | | | |
|---|---|---|---|
| 7,930,746 | B1 | 4/2011 | Sheleheda et al. |
| 7,933,989 | B1 | 4/2011 | Barker et al. |
| 8,150,783 | B2 | 4/2012 | Gonsalves et al. |
| 8,572,750 | B2 | 10/2013 | Patel et al. |

(Continued)

FOREIGN PATENT DOCUMENTS

CN 102262716 A 11/2011

OTHER PUBLICATIONS

The International Search Report and the Written Opinion of the International Searching Authority for PCT/US2015/039664, ISA/RU, Moscow, Russia, dated Oct. 15, 2015.

(Continued)

*Primary Examiner* — Paul E Callahan
(74) *Attorney, Agent, or Firm* — DLA Piper LLP (US)

(57) ABSTRACT

A method and system for adaptively securing a protected entity against a potential advanced persistent threat (APT) are provided. The method includes probing a plurality of resources in a network prone to be exploited by an APT attacker; operating at least one security service configured to output signals indicative of APT related activity of each of the plurality of probed resources; generating at least one security event respective of the output signals; determining if the at least one security event satisfies at least one workflow rule; and upon determining that the at least one security event satisfies the at least one workflow rule, generating at least one action with respect to the potential APT attack.

23 Claims, 12 Drawing Sheets

(56) References Cited

U.S. PATENT DOCUMENTS

| | | | |
|---|---|---|---|
| 8,800,045 B2 | 8/2014 | Curtis et al. | |
| 9,565,204 B2 | 2/2017 | Chesla | |
| 9,628,507 B2* | 4/2017 | Haq | H04L 63/145 |
| 2003/0233567 A1 | 12/2003 | Lynn et al. | |
| 2004/0114519 A1 | 6/2004 | MacIsaac | |
| 2004/0143756 A1 | 7/2004 | Munson et al. | |
| 2008/0086435 A1 | 4/2008 | Chesla | |
| 2008/0167567 A1 | 7/2008 | Bashour et al. | |
| 2008/0288430 A1 | 11/2008 | Friedlander et al. | |
| 2009/0043724 A1 | 2/2009 | Chesla | |
| 2011/0271341 A1 | 11/2011 | Satish et al. | |
| 2012/0096549 A1 | 4/2012 | Amini et al. | |
| 2012/0096551 A1 | 4/2012 | Lee et al. | |
| 2012/0096552 A1 | 4/2012 | Paek et al. | |
| 2012/0263382 A1 | 10/2012 | Robinson et al. | |
| 2012/0304007 A1 | 11/2012 | Hanks et al. | |
| 2012/0311132 A1 | 12/2012 | Tychon et al. | |
| 2013/0091085 A1 | 4/2013 | Sohn et al. | |
| 2013/0091150 A1 | 4/2013 | Jin et al. | |
| 2013/0097662 A1 | 4/2013 | Pearcy et al. | |
| 2013/0097706 A1 | 4/2013 | Titonis et al. | |
| 2013/0174256 A1 | 7/2013 | Powers | |
| 2013/0198840 A1 | 8/2013 | Drissi et al. | |
| 2013/0276122 A1 | 10/2013 | Sowder | |
| 2013/0333032 A1 | 12/2013 | Delatorre et al. | |
| 2014/0053267 A1 | 2/2014 | Klein et al. | |
| 2014/0068326 A1 | 3/2014 | Quinn | |
| 2014/0181972 A1 | 6/2014 | Karta et al. | |
| 2014/0215618 A1 | 7/2014 | Amit | |
| 2014/0283026 A1 | 9/2014 | Amit et al. | |
| 2014/0283050 A1 | 9/2014 | Amit | |
| 2014/0331279 A1 | 11/2014 | Aissi et al. | |
| 2014/0337974 A1 | 11/2014 | Joshi et al. | |
| 2015/0058993 A1 | 2/2015 | Choi et al. | |
| 2015/0128274 A1* | 5/2015 | Giokas | H04L 63/1425 726/23 |
| 2015/0242856 A1 | 8/2015 | Dhurandhar et al. | |
| 2016/0241581 A1 | 8/2016 | Watters et al. | |

OTHER PUBLICATIONS

The International Search Report and the Written Opinion of the International Searching Authority for PCT/US2015/060109, ISA/RU, Moscow, Russia, dated Mar. 10, 2016.
EP Search Report and Examiner's Opinion for European Patent Application No. EP 15 821755.4 dated Oct. 2, 2017, EPO, Munich, Germany.
First Office Action for Chinese Patent Application No. 201580038953.X dated Jan. 11, 2018, SIPO, China.
Communication Pursuant to Article 94(3) EPC for European Patent Application No. EP 15 821755.4 dated Apr. 23, 2019, EPO, Munich, Germany.
Notice of Decision of Rejection for Chinese Patent Application No. 201580038953.X dated Feb. 19, 2019, CNIPA, China.
Notice of Deficiencies for EP Application No. 15821755.4 dated Jul. 18, 2018, EPO, Munich, Germany.
Second Office Action for Chinese Patent Application No. 201580038953.X dated Jul. 31, 2018, SIPO, China.

* cited by examiner

CYBER-SECURITY SYSTEM AND METHODS THEREOF FOR DETECTING AND MITIGATING ADVANCED PERSISTENT THREATS

CROSS-REFERENCE TO RELATED APPLICATIONS

This application claims the benefit of U.S. Provisional Application No. 62/026,393 filed on Jul. 18, 2014 and U.S. Provisional Application No. 62/085,844 filed on Dec. 1, 2014, the contents of which are hereby incorporated by reference.

TECHNICAL FIELD

The present disclosure generally relates to cyber security systems, and more particularly to detecting and mitigating advanced persistent threats.

BACKGROUND

The Internet provides access to various pieces of information, applications, services, and vehicles for publishing information. Today, the Internet has significantly changed the way we access and use information. The Internet allows users to access services such as banking, e-commerce, e-trading, and other services people access in their daily lives.

In order to access such services, a user often shares his personal information, such as name, contact details, highly confidential information such as usernames, passwords, bank account number, credit card details, and the like, with service providers. Similarly, confidential information of companies such as trade secrets, financial details, employee details, company strategies, and the like are also stored on servers that are connected to the Internet. There is a threat that such confidential data may be accessed by malware, viruses, spyware, key loggers, and various other methods of unauthorized access to such information. Such unauthorized access poses great danger to unwary computer users.

Recently, the frequency and complexity level of attacks has increased on all organizations including, but not limited to, cloud providers, enterprise organizations, and network carriers. Some complex attacks, known as multi-vector attack campaigns, utilize different types of attack techniques and target network and application resources in order to identify at least one weakness that can be exploited to achieve the attack's goals, thereby compromising the entire security framework of the network.

Another type of complex attack is an advanced persistent threat (APT). An APT is an attack in which an unauthorized hacker gains access to a network and remains undetected for a long period of time. The intention of an APT attack is to steal data rather than to cause direct damage to the network or organization. APT attacks target organizations in sectors with high-value information, such as the national defense, manufacturing, retail, and financial industries.

These attacks are frequently successful because modern security solutions are not sufficiently agile and adaptive with respect to detection and mitigation of resources needed to meet such evolving threats. In addition, current security solutions cannot easily and promptly adapt to meet new technologies and topologies implemented by the entities to be protected.

For example, in modern computing platforms, such virtualization and software-defined networks (SDN) face real challenges to security systems. Such platforms host an enormous number of tenants with virtually distributed and dynamic resources. Each tenant can be transformed into a malicious resource, thereby attacking its own "neighbors," or other networks.

Current solutions for detecting APT attacks are based on sandbox and other emulation technologies in order to detect a "zero-day" malware activity. Another type of solution for detecting APT threats is based on reputation sources and attack signature matching (IPS/Ant-virus style). In typical implementation, sandbox and reputation are based on a cloud model, i.e., content objects are copied sent to a cloud platform for execution by sandbox devices and reputation information is being updated in the cloud platform and being "injected" to the APT devices in the network.

Due to privacy and security reasons, transporting content to a cloud platform out of the organization network may not be feasible to privacy reasons. Therefore most APT solutions include a private cloud sandbox deployment model. Such a model requires complex implementation. Furthermore, reputation and signature based detection mechanisms are considered non zero-day attack technologies. That is, rules are not updated based on previous detected incidents.

Attackers have been developed techniques to bypass sandbox technologies. For example, malware can be injected to a protect environment through an external device, e.g., a USB device or an unsecured network connection (e.g., a public Wi-Fi network). Further, attackers can design malwares that cannot be executed over virtualized or in simulated environments.

In addition, currently available solutions for handling APT attacks suffer from drawbacks including, for example, programmability capabilities, automatic mitigation, and collaboration. For example, a security defense system that is not programmable to allow changes or adaptations to the way the nature in which the protection means operate, becomes ineffective in a matter of a few days or even few hours because such security systems fail to resist or adapt to any new evasion attempts or new attacks behaviors.

Security solutions, and in particular solutions for handling APT attacks, do not provide a reliable automatic mitigation capabilities. Typically, APT security solutions are not designed for both detection and automatic mitigation. As a result, system administrators do not trust currently available APT security solutions to conduct automatic attack mitigation actions due to the high level of false positive alerts generated by such systems. As a result of such false positive alerts, system administrators must often manually analyze the system's logs, decide about the best mitigation action (e.g., most accurate action that mitigate the risk), and only then to provision network control actions that will mitigate the attack.

On top of the above, when a security manager/administrator needs to design and implement a security solution the administrator must be specialized in the devices he has, learning its available security device and in particular understand the configuration language of each such device. Currently, there is no unified standard for configuration of such devices and/or defining the requirements for protecting the security solutions. Therefore, the cycles for creating or changing the security policies in large organizations that deploy many and different security devices are typically prolonged.

It would therefore be advantageous to provide a solution that would overcome the deficiencies of the prior art solutions for detecting and mitigating APT attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Some embodiments of the disclosure relate to a method for adaptively securing a protected entity against a potential advanced persistent threat (APT). The method comprises probing a plurality of resources in a network prone to be exploited by an APT attacker; operating at least one security service configured to output signals indicative of APT related activity of each of the plurality of probed resources; generating at least one security event respective of the output signals; determining if the at least one security event satisfies at least one workflow rule; and upon determining that the at least one security event satisfies the at least one workflow rule, generating at least one action with respect to the potential APT attack.

Some embodiments of the disclosure relate to a system for adaptively securing a protected entity against a potential advanced persistent threat (APT). The system comprises a processor; and a memory, the memory containing instructions that, when executed by the processor, configure the system to: probe a plurality of resources in a network prone to be exploited by an APT attacker; operate at least one security service configured to output signals indicative of APT related activity of each of the plurality of probed resources; generate at least one security event respective of the output signals; determine if the at least one security event satisfies at least one workflow rule; and generate at least one action with respect to the potential APT attack, upon determining that the at least one security event satisfies the at least one workflow rule.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
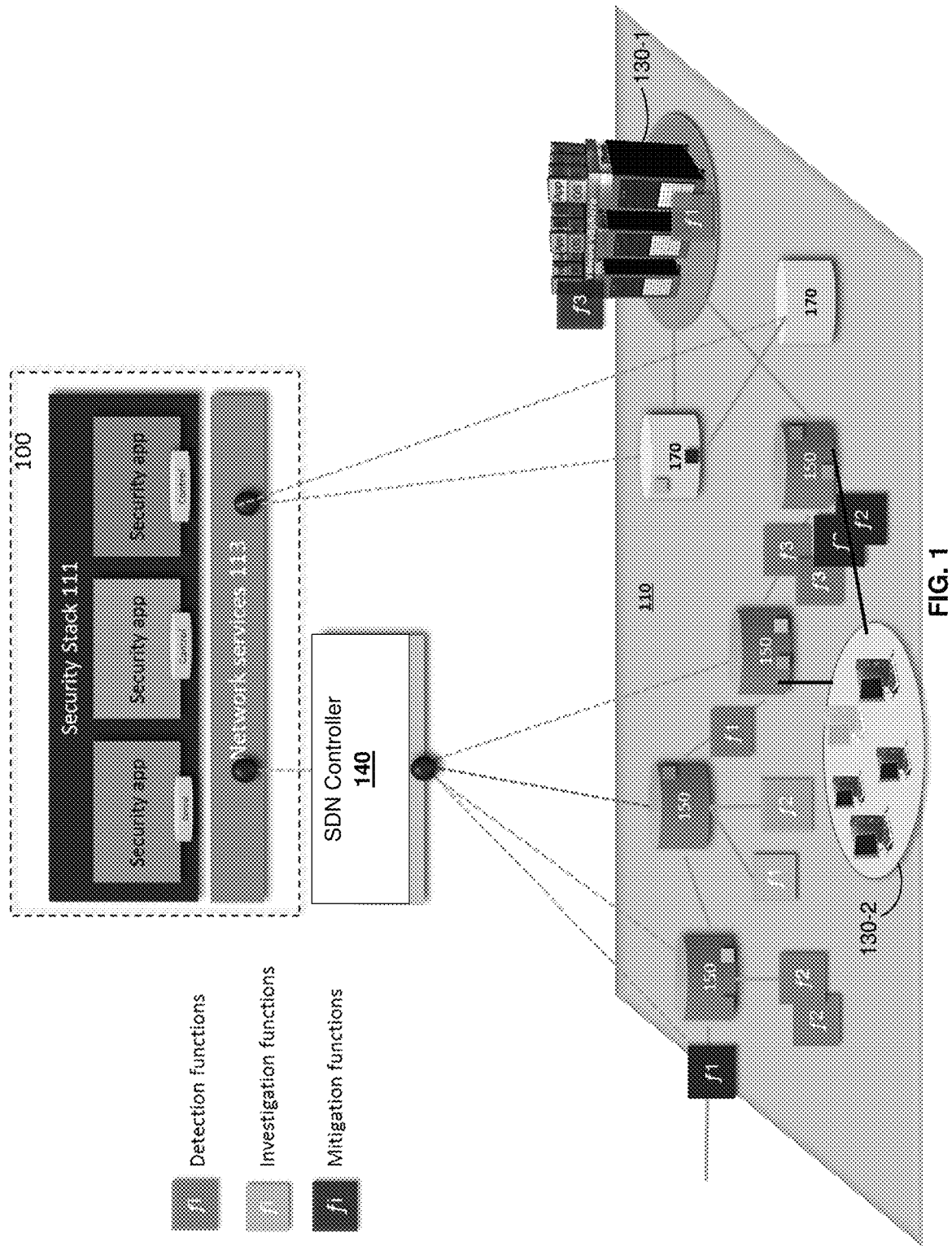
FIG. 1 is a diagram of a cyber-security system implemented according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include cyber security systems and methods thereof. The disclosed embodiments are designed to protect entities. A protected entity may include, for example, a layer-2 (L2) or layer-3 (L3) network element, a server application (e.g., Web, Mail, FTP, Voice and Video conferencing, database, ERP, and so on), "middle boxes" devices (e.g., firewalls, load balancers, NAT, proxies devices etc.), SDN controllers (e.g., Open Flow controllers and virtual overlay network controllers) and personal computing devices (e.g., PCs, laptops, tablet computers, smartphones, wearable computing devices, etc.). The protected entity may be deployed or otherwise accessed through various computing platforms. The computing platforms may include, but are not limited to, virtualized networks and software defined networks and software defined datacenters (SDNs and SDDCs).

In some embodiments, the disclosed cyber security system is configured to detect and mitigate multi-vector attack campaigns that carry APT attack campaigns. The APT attack campaigns include, but are not limited to, intelligence gathering stage, network pre-attack probes, malware propagation, information leak, and so on. The disclosed cyber security system achieves comprehensive protection by overcoming the drawbacks of prior art solutions, such of which have been discussed above.

The cyber-security system is arranged as a layered architecture allowing the system to adapt to changes in the protected entity and to ongoing attack campaigns. In one embodiment, the cyber security system provides the ability to create, define, or program new security applications, to modify the functionality of existing applications, and to easily correlate and create workflows between multiple security applications.

A security application is programmed to detect and mitigate a threat to the protected entity, determine which specific resources should be utilized for the protection, determine where the protection should take place, and so on. In an embodiment, a security application can be programmed using a set of security services discussed in more detail below.

FIG. 1 is an exemplary and non-limiting diagram of the cyber security system 100 utilized to describe the various disclosed embodiments. The cyber security system 100 is configured to protect an entity (hereinafter a "protected entity") 130 communicatively connected in a network 110. The cyber security system 100 is also connected to the network 110. The network 110 may be, but is not limited to, a virtualized network, a software defined network (SDN), a hybrid network, cloud services networks, or any combination thereof. The protected entity 130 may include a client network 130-2 or a designated resource 130-1, such as a server, a point of sale host, a web service, a mail service, a database service, and so on. The client network 130-2 may be, for example, a local area network (LAN), etc.

An SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, a DPI device, and so on, as well as any virtual instantiations thereof. Typically, elements of the SDN include a central SDN controller 140 and a plurality of network elements 150. In certain implementations, the central SDN controller 140 communicates with the network elements 150 using an OpenFlow protocol which provides a network abstraction layer for such communication, Net-conf protocol which provides mechanisms to install, manipulate, and delete the configuration of network devices, and so on.

In an embodiment, the network 110 may be a hybrid network in which a SDN is a sub-network of a conventional network in which its elements 150 cannot be programmed by a central SDN controller 140. The cyber security system 100 interfaces with the network 110 through the central SDN controller 140. In another embodiment, the entire functionality or portion of the functionality of the security system 100 can be integrated in the central SDN controller 140. Alternatively, the functionality of the cyber security system 100 operates directly with the network elements 150 in the data-plane (or it can be a combination of the above). This allows implementing security functions in various locations in the network 110 (SDN, Legacy (non-SDN) networks, or hybrid networks) to protect the protected entity 130.

The security functions are programmed by the cyber security system 100 to perform any one of, or a combination of, detection, investigation, and mitigation functions (labeled as f1, f2, and f3 in FIG. 1). Such functions are executed during different phases of the operation of the cyber security system 100, i.e., detection, investigation, and mitigation phases and independently programmed by the cyber security system 100. It should be noted that same or all the functions (f1, f2, and f3) can be implemented, or otherwise performed, in the network 110. It should be noted that the security functions can be reused throughout the different phases of the system operation for different purposes.

In an exemplary implementation, the cyber security system 100 includes a security stack module 111 and a network services module 113. The security stack module 111 is configured to control and execute the various phases to secure the protected entity 130. Specifically, the security stack module 111 is configured to create, control, program, and execute the security functions (f1, f2 and f3) through a plurality of security applications or "apps." The operation of the security stack module 111 is discussed in greater detail herein below with respect to FIG. 2.

The network interface module 113 provides an interface layer of the cyber security system 100 with the central SDN controller 140 to allow commutation with SDN-based network elements 150. In another embodiment, the network interface module 113 also communicates with "legacy" network elements 170 in the network 110. Non-limiting examples for communication drivers that allow the network interface module 113 to configure, control, and monitor legacy network elements (and technologies) 170 include, but are not limited to, BGP, BGP flow spec, NetConf, CLIs, NetFlow, Middle-boxes devices drivers (e.g., layer 4 to 7 devices such as DPI devices, firewall devices, ADC (application delivery controllers) devices etc.), end point device drivers (mobile, host based security applications), server applications such as DNS applications, Web applications, and so on.

Figure 2:
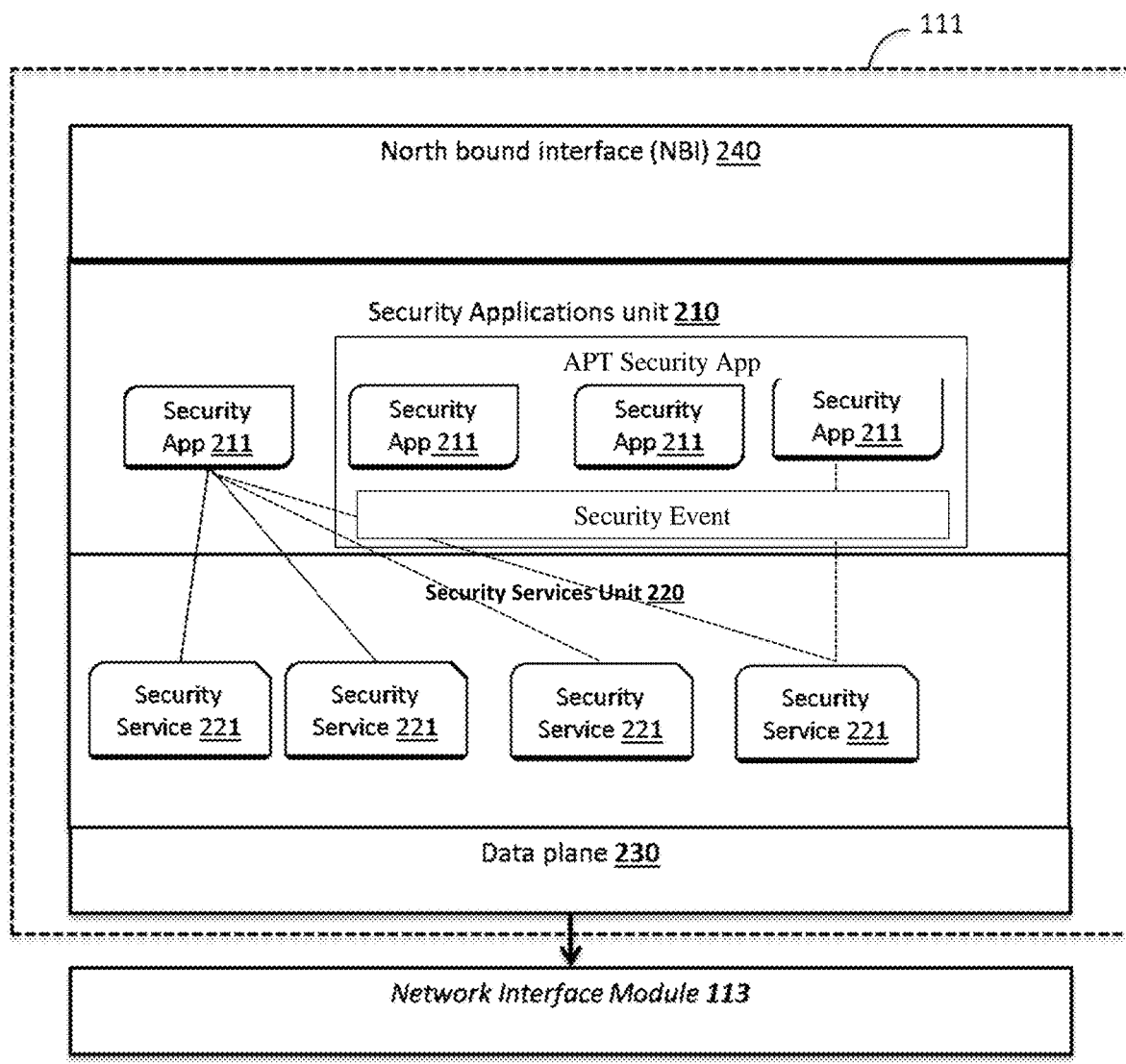
FIG. 2 is a block diagram of a security stack module implemented according to one embodiment.

FIG. 2 shows an exemplary and non-limiting block diagram of the security stack module 111. In an exemplary implementation, the security stack module 111 includes the following units: a security application unit 210, a security services unit 220, a data-plane unit 230, and northbound network interface (NBI) 240. The security stack module 111 is configured with a security services unit 220 and various services provided by the data-plane unit 230 that can be utilized for the execution of different security applications. Thus, security applications (each one for different purpose) can consume the same security services for their own needs. In addition, various data-plane services can be utilized by services residing in the security services unit 220.

Specifically, the security application unit 210 includes at least one security application (app) 211 for APT detection and mitigation inside an organization network. Other security applications designed to provide a different type of security protection or function including, for example, low and slow DoS attacks protection, reputation security intelligence, web page scraping detection and mitigation, volumetric DoS detection and mitigation, can reside in the security application unit 210 as well.

According to one embodiment, different APT security applications can be executed in the security stack module 111 for different protected tenants. In such an embodiment, a protected tenant is an entity in the organization or an organization. As an example for the former, one APT security application can be programmed to protect HR department resources while another application can programmed to protect resources of the finance department. The HR department and finance departments are different protected tenants. The different resources may be part of a client network (e.g., the client network 132 shown in FIG. 1).

According to an embodiment, the cyber security system 100 is designed to allow correlation between security applications in the security applications unit 210 and security services in the security services unit 220 in order to define, create, or otherwise program a robust solution for detecting and mitigating attacks against the protected entity 130-1 or 130-2.

The NBI 240 and the security services unit 220 provide the required services for the security applications 211. The APT security application 211 is configured to implement pre-defined APIs in order to efficiently communicate with the security services 221.

In one embodiment, the security services 221 are designed, in part, to allow identifying behavior of hosts and entities in the organization and detect abnormal network behavior results due to infected users and entities. Each security service 221 is designed to host multiple programmable security decision engines (SDEs, not shown in FIG. 2). The creation and modification of such SDEs can be performed through a SDE programming language. The SDEs, and thereby the security services 221, can allow the cyber security system 100 to adapt to new attack behavior, unknown behaviors, or attacks that utilize new evasion techniques. The security services 221 are also designed to provide an efficient control over security functions (f1, f2, and f2) in the network data-plane. The security services 221 utilized by the APT security application 211 are discussed in more details below with respect to FIG. 3.

The data-plane unit 230 provides central management and control of the data-plane resources, such as routers, switches, middle-box devices, and so on. In an embodiment, the data-plane unit 230 allows the security services 221 to retrieve and store the required network and application information from the data plane resources as well as to enforce security related network control actions. Various functions provided by the data-plane unit 230 includes a topology discovery, data collection, traffic redirection, traffic distribution (L2, L3 load balancing for scaling out resources), traffic copy, and so on.

Topology discovery involves interacting with the data-plane network elements, SDN controllers, and orchestration systems in order to retrieve network topology information. This function is important for the topology awareness that is needed by other data-planes' functions as well as security services 221 and security applications 211.

The traffic copy and redirection functions are designed to manage all network traffic redirection functions which include, but are not limited to, traffic redirection, smart traffic copying, traffic distribution, and so on.

The data-plane unit 230 is further configured to provide the following functions: management of quality of service (QoS) actions in the network elements, and a set of mitigation functions. The mitigation functions include basic ACLs services which are layer-2 to layer-4 access control list services that manage the distributed rules throughout the network elements. Software defined networks as well as legacy network elements 170 and hybrid networks may be supported by this service.

Advanced ACL functions are similar in characteristics to the basic ACL functions but can define more granular access rules including application parameters (L7). Specifically, this function can be activated according to the generated risk-chain pattern from the risk-chain pattern generation service (discussed below) as a blocking rule. The function typically operates with DPI network elements, such as, but not limited to, next generation firewalls, security web gateways for enforcing the application level ACL rules. Service rate-limits manage the QoS rules in the data plane device. Black-hole route function provides an extension of the redirection data-plane services that manage redirection of users into a black-hole. Typically, black holes are network locations where incoming or outgoing traffic is silently discarded (or "dropped"), without informing the source that the data did not reach its intended recipient. In general, the data-plane unit 230 provides all information that is required by the security services 221, and controls the network 110 via decisions made by the security services 221 and security applications 211.

In some exemplary implementations, certain functions provided by the data-plane 230 can be implemented in the central SDN controller 140. Examples for such functions may include, but are not limited to, traffic redirection, topology discovery, and data collection.

The NBI 240 interfaces between the security stack module 111 and one or more external systems (not shown). The external systems may include, for example, third party security analytics systems, security intelligence feeds (e.g., reputation sources), security portals, datacenter orchestration control systems, identity management systems (such as domain controllers), DNS and DHCP services, or any other system that can provide information to the security stack module 111. The interfaces may be, but are not limited to, CLI, REST APIs, Web UI, as well as drivers for control and/or configuration, of external systems and so on. The NBI 240 also interfaces with network services module 113.

In certain implementations, each unit 210, 220, 230, and 240, as well as the security stack module 111, are communicatively connected through a predefined set of interfaces and/or APIs. As a result, the disclosed cyber security system 100 is fully programmable and configurable. The interfaces and/or APIs may be designed to be unidirectional, bidirectional, or one-to-many bi-directional flows of information between the various modules and units.

It should be noted that modules in the cyber security system 100 and units 210, 220, and 230 in the security stack module 111 are independent. Thus, any changes in one unit or module do not necessarily result in any changes to the other modules.

As noted above, one or more security applications 211 can be correlated with one or more security services 221 in order to define, create, or otherwise program a robust solution for detecting and mitigating APTs. A security application 211 typically correlates security signals generated by multiple security services 221. This allows a single security application 211 to make decisions based on multiple services in order to increase the overall decision accuracy. The correlation among security applications 211 is also performed by correlating security events (feeds) generated by other security applications 211, thereby allowing the entire security decision-making process to be more holistic and context-based.

According to one embodiment, the correlation of security events is performed by a set of the workflow rules which are processed and applied by the APT security application 211. In an embodiment, the set of workflow rules are defined by the user. In another embodiment, a learning mechanism is implemented to modify or select a set of correlation and workflow rules to execute. The correlation process is discussed in greater detail below with respect to FIG. 5.

Each, some, or all of the modules of the cyber security system 100 and the various units of the security stack module 111 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 3:
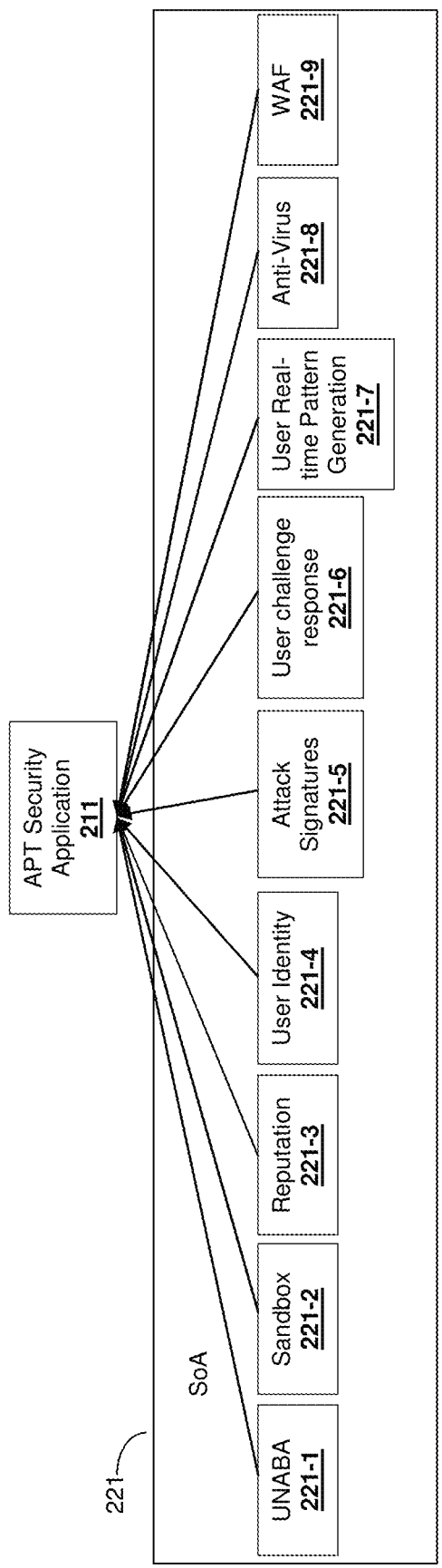
FIG. 3 illustrates security services utilized by the APT security application according to an embodiment.

FIG. 3 shows an exemplary and non-limiting diagram of the security services 221 and data-plane services 230 utilized by the APT security application 211. It should be noted that the security services 221 (and/or their associated SDEs) can be dynamically added, removed, or modified to provide an accurate and timely detection of APT threats.

According to an exemplary and non-limiting implementations, the following security services 221 may be utilized by the APT security application 211: a user network and application behavior anomaly (UNABA) security service 221-1, a sandbox security service 221-2, a reputation security service 221-3, a user identity security service 221-4, an attack signatures security service 221-5, a user challenge-response security service 221-6, a real-time risk-chain pattern generation security service 221-7, an anti-virus (AV) security service 221-8, a Web application (WAF) security service 221-9.

The UNABA security service 221-1 is a service that analyzes host-based traffic behavior. The UNABA security service 221-1 includes a host profile data structure and a set of SDEs programmed to continuously generate host-based scores of anomaly (SoA). A host can be any machine or resource connected to a network. For example, a host may include a client device, a server, a database, an end-point terminal (e.g., PoS), and the like. The activity of users utilizing client devices can be derived from the profile learnt for such device.

In an embodiment, a SoA is a security signal that can be correlated by a security application 211. A high SoA reflects a host traffic anomaly that characterizes different types of network based attacks, such as network pre-attack probes scanning activities (intelligence gathering), malware propagation activities, abnormal remote desktop communication channels, abnormal processes installation channels, brute-force attack activities (user/pass cracking), unexpected traffic flows that represent in general a compromised host, abnormal protocol usage that represent "fake" applications, drop-zone (or drop point) traffic behavior which represents data leak from specific hosts, and so on.

The UNABA security service 221-1 is programmed to continuously learn the network and application connections activities of a host (or a group of hosts). The UNABA security service 221-1 implements a long-term (e.g., at least 12 weeks) of adaptive baselines per each traffic parameter. The host profile data structure of this service aggregates L2-L7 (layer 2 through layer 7 of the OSI model) parameters as well as application metadata and continuously generates base lines for each parameter (or for multiple parameter functions, such as traffic ratio), including 24 by 7 (24×7) differentiated baselines, i.e., storing base line per time and day in the week.

The UNABA security service 221-1 includes a set of SDEs programmed by a set of engine rules. A user can modify and program new SDEs by defining a new set of engine rules. Each SDE is programmed to continuously generate SoA per each host or hosts group. As noted above, high SoA reflects unusual user/service application activity as mentioned above. A detailed block diagram of the UNABA security service 221-1 is provided in FIG. 4.

In an embodiment, the UNABA security service 221-1 can be programmed to generate SoA that correlates signals from other security services 221. Such correlation is performed by a set of engine rules discussed in greater detail below.

The sandbox security service 221-2 is programmed to selectively select the required sandbox function that is required to analyze content, such as web objects, mails attachments, executable files, and so on. The sandbox security service 221-2 is configured to control and manage the sandbox functions resources as well as analyze their outputs according to the correlation and workflow rules.

The sandbox security service 221-2 is configured to activate the most relevant sandbox function according to the ongoing threat. For example, if a threat was detected and the host(s) associated with it are all based on MS operating system, then the sandbox security service 221-2 is instructed to select (instructed by the security application) a sandbox function that is best in analyzing MS based object files and to manage the sand box function to direct its resources on these high risk detected hosts first. The security application is configured (through the security application's workflow and correlation rules) to correlate the sandbox outputs with other security services outputs, such as with the user network and application anomaly security service.

The attack signatures security service 221-5 is configured to allow management of multiple types of intrusion detection and prevention functions in the network. The service allows the security application to define and activate the relevant attack signature policies according to the ongoing detected threat, and monitor the results in a way that can be managed by the security app 211 or by other security services 221. For example, when the UNABA security service 221-1 detects suspicious user brute-force attack activities, then the security application 211 will instruct the attack signature service 221-5 to activate a brute-force attack signature policy only on the suspicious host to allow accurate and efficient detection of the attack.

The reputation security service 221-3 is configured to allow managing and analyzing of multiple reputation sources (e.g., third party intelligence security sources). The reputation security service 221-3 is further configured to allow the security application 211 to inquiry the most relevant reputation source according to the ongoing detected threat. For example, if the UNABA service 221-1 identifies suspicious drop zone activity, then the APT security application can instruct the reputation security service 221-3 to select the most relevant reputation source and to monitor all traffic between the drop zone host(s) and external sites. In this case the reputation security service 221-3 automatically selects reputation source(s) with a database that has the information about external drop point sites and/or command-and-control (C&C) external servers that are known to be associated with controlling internal drop points servers. In general, for APT threats detection, the analysis and management of reputation information is focused on phishing sites, bad reputation malware sites, malware C&C sites and drop zones sites.

In an embodiment, a user identity security service 221-4 is configured to allow mapping a source IP address to a network host and user identity. To this end, the user identity security service 221-4 is configured to query an identity management system such as DNS and DHCP and Domain controllers (e.g., ActiveDirectory).

Other types of a security service 221 that can be used to detect APT threats include, but are not limited to, a user challenge-response security service 221-6 that is configured to allow the programming of advanced challenge-response actions that validate the legitimacy of users' applications. As in the case of the other security services, the user challenge-response security service 221-6 is configured to allow the security application 211 to instruct validation of a specific hosts' application through the most appropriate challenge response actions, and according to the on-going detected threat. According to some exemplary embodiments, the user challenge-response security service 221-5 is configured to activate different types of challenge-response mechanisms according the protocol and application that is to be validated (e.g., HTTP challenge for HTTP protocol related applications communication, DNS challenge for DNS traffic etc.).

Another type of security service 221 that can be utilized for detection of APT threats is a real-time risk chain pattern generation security service 221-7, which is configured to analyze a detected anomaly parameter (e.g., anomaly that was detected by the user network & application anomaly service) and create a pattern that characterizes the anomaly.

Such pattern is used for real-time investigation actions and mitigation actions of threats, as well as for forensics analysis.

In an embodiment, the real-time risk chain pattern generation security service 221-7 is configured to provide the security application 211 the risk chain development pattern, and in return the security application 211 decides which security services 221 need to be activated. The decision is based on a set of correlation and workflow rules (that are either set manually or automatically by the system).

It should be noted that the security services 221 listed above are merely examples and other services can be utilized in the cyber security system 100 according to the embodiments disclosed herein. In various non-limiting embodiments, a programming language is provided in order to allow users to create and modify security applications 211 and to create and modify the SDEs contained in each security service 221, as per business needs.

Figure 4:
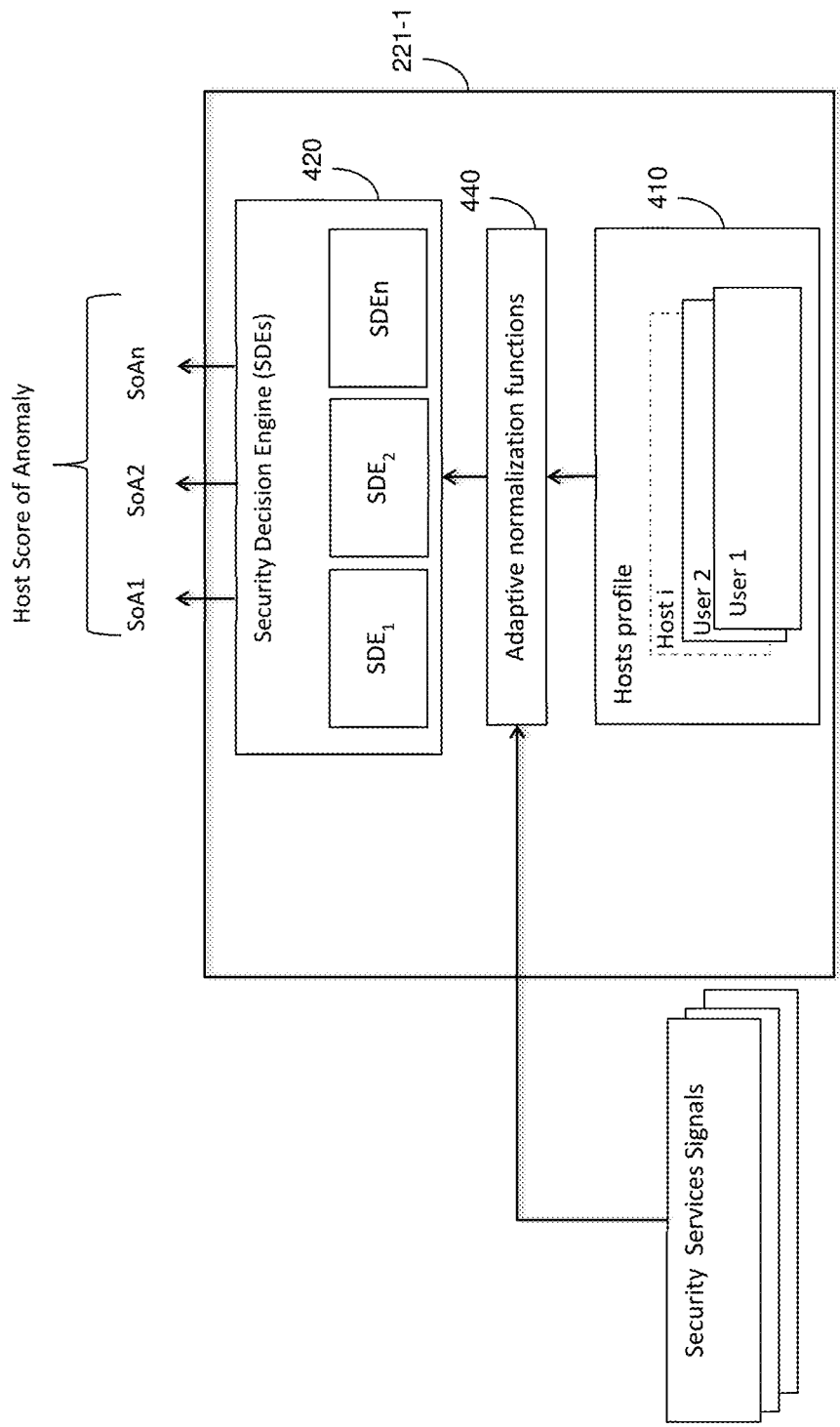
FIG. 4 is a block diagram of the user network and application behavior anomaly security service according to one embodiment.

FIG. 4 shows an exemplary block diagram of the UNABA security service 221-1 according to one embodiment. The UNABA security service 221-1 is a cornerstone in detecting APT attacks as typically hackers gain access to a network 110 and remain undetected for a long period of time by exploiting legitimate users' and servers' hosts in the network 110 and pretending normal behavior of such users and servers activities.

The UNABA security service 221-1 includes a host profile module 410, a plurality of user anomaly behavioral SDEs 420, and a set of normalization functions 440. The host profile module 410 is configured to store and compute baseline parameters for the host activity over a period of predefined time (e.g., 12 weeks). The host profile module 410 typically stores baselines of each host traffic parameter as well as baselines of multiple parameters function (e.g., ratios of inbound vs. outbound traffic parameters, relative portions of application traffic parameter, relative frequency, and so on). Each, some, or all of the modules and/or engines of UNABA security service 221-1 may be realized by a processing system. Examples for such a processing system are provided above.

In an embodiment, each profile stored in the host profile module 410 is structured with two sections: classification and characteristics. The classification includes host traffic classification parameters in a hierarchy structure. Each hierarchy level is defined as a "flow-path." The characteristics section includes dynamic characteristics of traffic parameters per each classification flow-path. The characteristics of a traffic parameter include real-time and baselines of rate and rate-invariant parameters.

The user anomaly behavioral SDEs 420 are configured to generate based on engine rules and the respective profile and flow-path a SoA per host. In order to compute a SoA for a host, real-time as well as adaptive baselines of a host are retrieved from the host profile module 410 and each parameter therein is normalized by normalization functions 440. As noted above, each parameter or a set of parameters has its own normalization function 440. The adaptive normalization functions are tuned by the adapted base lines in a predetermined time interval. In an embodiment, the time interval is one hour. Each normalization function 440 generates a parameter deviation weight (a behavior anomaly level) in a format that can be processed by the user anomaly behavioral SDEs 420. Normalization functions 440 are also responsible for normalizing signals from other security services 221 as shown in FIG. 4.

The computed SoAs are provided to the APT security application 211, which decides an action to be executed. Such an action may include, for example, activate more SDEs in the detection phase, initiate an investigation phase and activate investigation services, initiate mitigation phase and activate mitigation services, and so on. It should be noted that the security application workflow decisions are based on the real-time risk-chain pattern generation service results (i.e., the risk chain pattern and its progress in time).

As shown in FIG. 4, the UNABA security service 221-1 can also correlate outputs (signals) of other security services 221. A typical correlation may be with outputs from, reputation 221-3, attack signatures 221-5, and sandbox 221-2 security services (discussed in detail above). The outputs of the security services 221 (which are inputs to the UNABA security service 221-1) may be integer values, Boolean values, and other values. Such values are normalized by the normalization functions 440 into a format that can be processed by the SDEs of the UNABA security service 221-1.

In order to detect APT attacks, the UNABA security service 221-1 is configured with a set of SDEs 420. Each such SDE 420 is programmed to evaluate or detect host's user or server behavioral anomalies caused due to APTs' activities. These anomalies that each SDE 420 is responsible to evaluate abnormal usage of include, but not limited to, pre-attack research and intelligence gathering activities (manually or automatically generated) such as network probes, application probes, brute-force activities to reveal user/pass, propagation activities, data leak activities, and so on.

The propagation activities (manually and automatically generated) include, for example, abnormal remote desktop traffic. Such abnormal traffic may be, but is not limited to, abnormal files copied to or from remote hosts, abnormal processes execution on remote hosts, abnormal service(s) activations/terminations (e.g., FTP or Mail service enablement on some server etc.). Other propagation activities that the SDEs 420 are responsible to detect include, for example, malware spreading/propagation activities, malware automatic brute-force activities, and so on.

In an embodiment, data leak activities (manual or automatic), such as abnormal communication of a "crowd" of hosts that are infected with some malware and which upload data to specific host(s) in the organization (defined as internal drop zone or point), abnormal upload of data from hosts that are known to include confidential information to other sites outside of the organization, and so on.

In an embodiment, SDEs 420 analyzing unexpected traffic flows are also utilized by of the APT security application 211. These SDEs 420 are part of the UNABA security service 221-1 and analyze the "maturity" of each host in the network 110 according to time and traffic parameters. A "mature" host or user that starts to communicate with other network hosts and utilize protocol(s) and/or application(s) not previously used, is flagged as suspicious. Flagged hosts and users are typically involved in one of the attack stages mentioned above (e.g., pre-attack intelligence gathering, propagation or data leak).

Other malicious activities that can indicate a potential APT attack include unusual geographic communication (e.g., users communicate with new geographical locations); unusual user's application behavior; unusual content type consumed by a specific application (e.g., binary content to Facebook® or Twitter® accounts); hosts connections with unusual traffic symmetry (e.g., unusual upload or download activities, clients that act like servers, etc.); unusual time-based activity (24×7 activity) of hosts based on parameters, such as L4 connection, bandwidth, destinations, application type, abnormal periodic behavior, and so on.

The user anomaly behavioral SDEs 420 can be also configured to detect or evaluate anomalies related to applications executed on a host device. Such anomalies include, for example, unusual DNS traffic (e.g., too many DNS query from the same client, same size of DNS requests from the same client, fast flux behavior (e.g., same domain that is represented by multiple dynamically changed IP addresses); unusual browser types usage, and the like. In an embodiment, each user anomaly behavioral SDE 420 generates a SoA that quantifies the deviation of the host's, or hosts group's behavioral parameters from the norm as determined by a respective of profile maintained in the host profile module 410. The SoA may be in a form of an integer value, a Boolean value, or a certain level (e.g., high, low, medium), or any other form that measures level of activity. The SoA is continuously generated, and thereby can be changed over time and can be used to measure trends of anomaly scores.

As noted above, the SoA is generated by a set of decision engine rules that can be processed by each engine in a security service 221. The engine rules typically include one or more of: a set of Boolean operators (e.g., AND, OR, NOT); a set of weights level (Low, Mid, High); and so on. The generated SoA (signals) are fed to the security application 211. The security application 211 can translate the signals into a security event fed to the application's correlation and workflow rule (544). For example, a high SoA value may be translated into a security event, while a low SoA value may not create an event.

Figure 5:
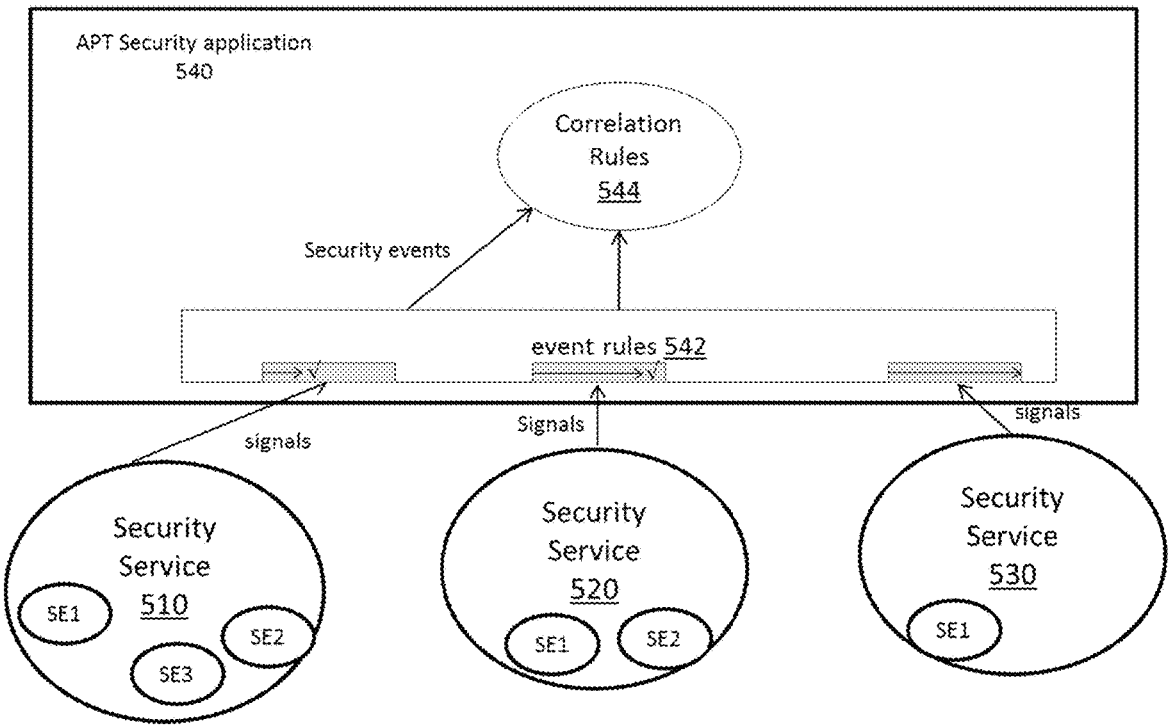
FIG. 5 illustrates the processing of security signals and security events by a security stack module according to one embodiment.

FIG. 5 shows the processing of security signals according to an exemplary and non-limiting embodiment. In this example, each of the security services 510, 520, and 530 generates security signals by means of their respective SDEs. The SDE 510, 520, and 530 may be any of the security services noted above. The security signals are fed to an APT security application 540 that checks if one and/or any combination of the received signals satisfy at least one event rule 542. The security signals may be generated in response to detection of malware activity such as pre-attack intelligence gathering, malware propagation activities, drop zone behavior, and so on.

The event rules 542 can be applied on the signal value, duration, and so on. In a non-limiting embodiment, a syntax of the event rule may be defined as follows:

IF <level><signal type><signal attribute(s)><condition type><operator condition><units><$2^{nd}$ condition type><units> THEN event <"event name">

The various parameters of the event rule are defined in the exemplary Table 1.

TABLE 1

| Operator/Parameter | Description | Values/Options |
| --- | --- | --- |
| <level> | The anomaly level of signal | H—High<br>M—Med<br>L—Low |
| <signal type> | A type of the generated signals | SoA—Score of Anomaly<br>Rep.—Reputation score<br>AV Alert—AV attack<br>IPS Alert—Intrusion attack<br>Sandbox Alert—Sandbox attack |
| <Signal attribute> | A structure of optional meta data attributes associated with the signal that can be set. | Src ID—Host name, Hosts group, IP address User name<br>Src risk—High, Med, Low that represents a level of risk associated with the source ID.<br>Dst ID—Same as Src<br>Dst risk,—Same as Src risk<br>Prot—L4 protocol<br>L7 prot—L7 protocol name<br>Dport—L4 port number<br>Application—Application name |
| <Condition type> | Types of conditions that can be selected in the rule | Period<br>Occurrences |
| <operator condition> | Logical conditions | >, =>, =, <= |
| <units> | The threshold that the user sets according to the condition type that was selected | Time units<br>Occurrences units |
| <$2^{nd}$ condition type> | $2^{nd}$ condition type that can be selected in the in the rule | In-period<br>Unlimited |
| <"event name"> | The name of the event that will be triggered. The system generates a unique event ID as well. | User defined text |

Figure 6:
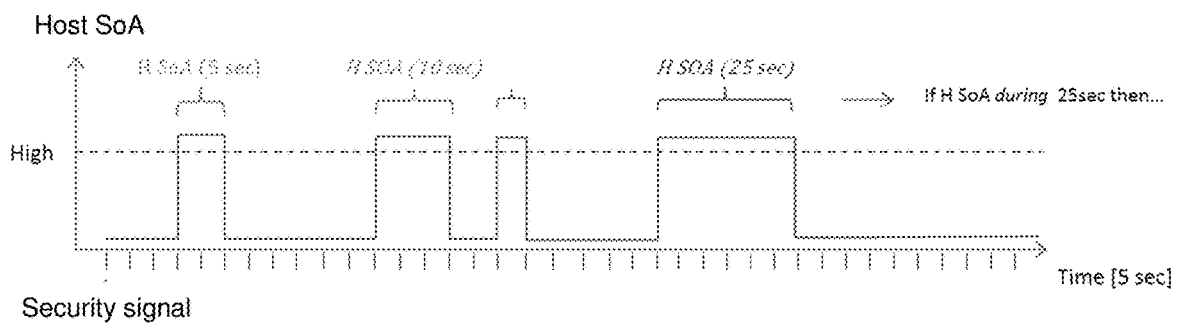
FIG. 6 is an example for a security event derived from a SoA signal.

For example, FIG. 6 shows a security signal derived from a SoA value. The security signal is in a form of a pulse. In this example, the event rules 542 define that if the pulse is high (high SoA) for a duration of more than the 25 seconds, then a security event is triggered. An example for an event rule for detecting network scan is:

If <H>SoA=>1 m, then event <auto probe>

The rule identifies that if the value of the SoA is high for a duration of at least 1 minute, then an event is triggered. For example in this case the event represents a scan activity, which is part of a pre-attack probe activities.

Referring back to FIG. 5, security events generated from signals received only from services 510 and 520 are shown. That is, signals from service 530 did not match any event rule 542. The security events are correlated by the application 540 using the correlation rules 544. As noted above, events that satisfy at least one correlation rule 544 will trigger an action, such as, but not limited to, a mitigation action, an investigation action, and so on.

As an example, a correlation rule 544 can correlate between a reputation event and a host anomaly event. In an embodiment, correlation rules 544 can be defined for the different phases of the operation of the system security application 211, i.e., detection phase, investigation phase, and a mitigation phase.

The operation of the security services discussed above can be utilized during the detection phase, investigation phase and mitigation phase of the APT security application. The detection phase can be concluded upon a determination that a potential attack is taken place. Such detection in achieved once a detection correlation rule 544 is satisfied.

The investigation phase may be activated in order to validate (or de-validate) and better define the attack behavior. This phase is typically a more advanced detection phase that narrows down the scope of suspicious hosts and identifies more specific traffic flows associated with the anomaly from and to these hosts. Thus, the investigation phase can be utilized to reduce the false positive event rate into a level that allows accurate mitigation of the threat, filter out unnecessary logs, and to evaluate the potential impact of the security incident. Further, the investigation phase allows for making an educated decision about the level of mitigation operations.

The operation of investigation phase may be performed by the various security services described above. Specifically, the following security services can be utilized during the investigation phase. The attack signature security service 221-5, the reputation security service 221-3, the sandbox security service 221-2, the Anti-Virus (AV) service 221-8, and the user challenge/response security service 221-6 which can be also used in the mitigation phase.

The following describes the operation of the cyber security system 100 to detect an APT campaign that was result with a breach occurred in a retail chain. In this case, during the APT attack confidential information of customers is targeted (e.g., credit cards, passwords, identities, and social security numbers). The following is a discussion of the APT attack lifecycle and implementations of the disclosed APT security applications and engines to prevent such an attack.

Figure 7:
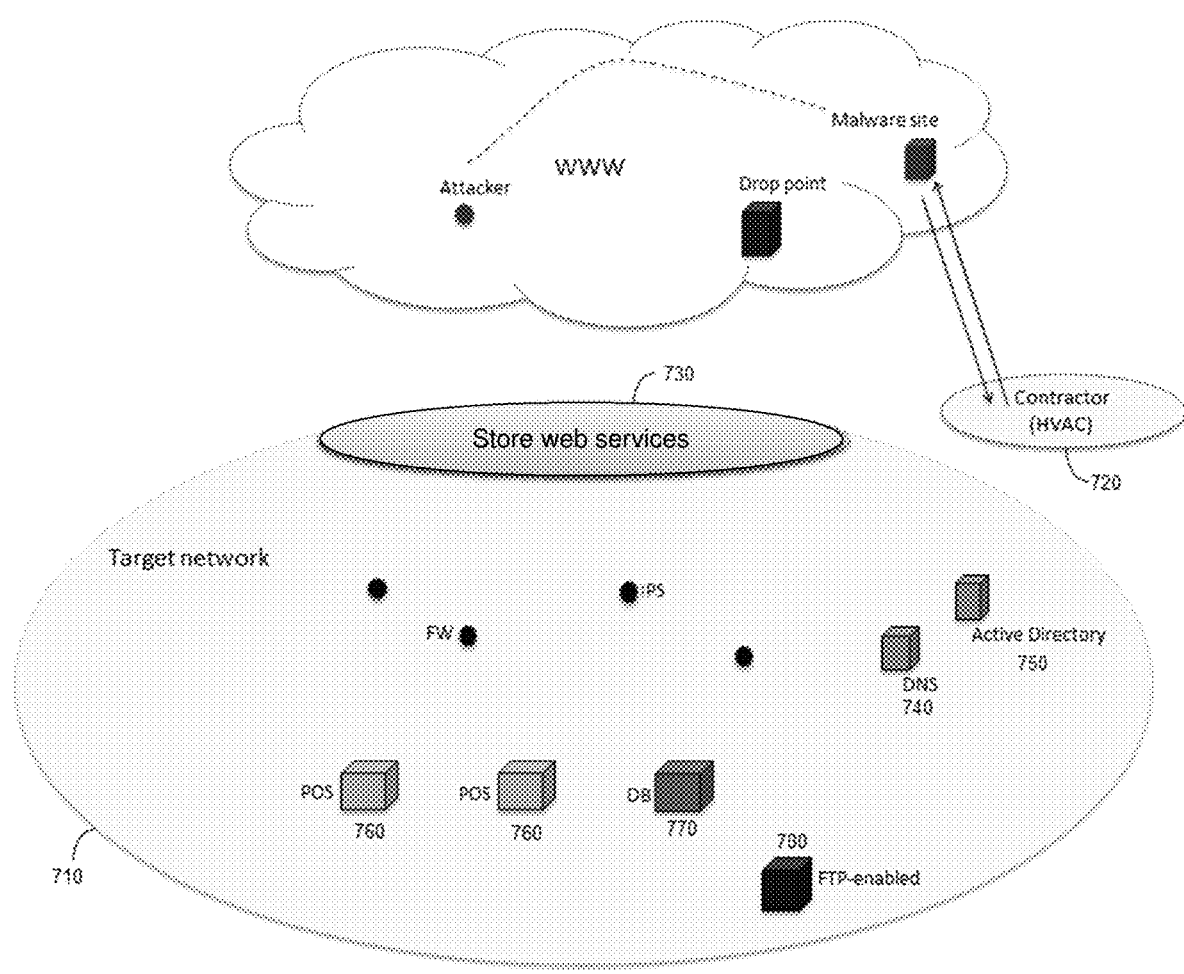
FIGS. 7-13 illustrate the operation of the cyber security system to detect a potential APT breach occurring in a retail chain.

In FIG. 7 the first stage of the attack is illustrated. In this stage, an intrusion is performed into a retail store's network 710. The retail store's network 170 is the first point from which the entire attack campaign is conducted.

The attack begins with an intrusion into one of the retail store's external contractors 720. The attacker uses the Citadel malware through the use of a phishing email campaign. This malware is designed to steal personal information and credentials through man in the browser (MitB) techniques. In this example, the malware is used in order to steal web application credentials within an infected machine browser of the external (HVAC) contractor 720 of the retail store.

Figure 8:
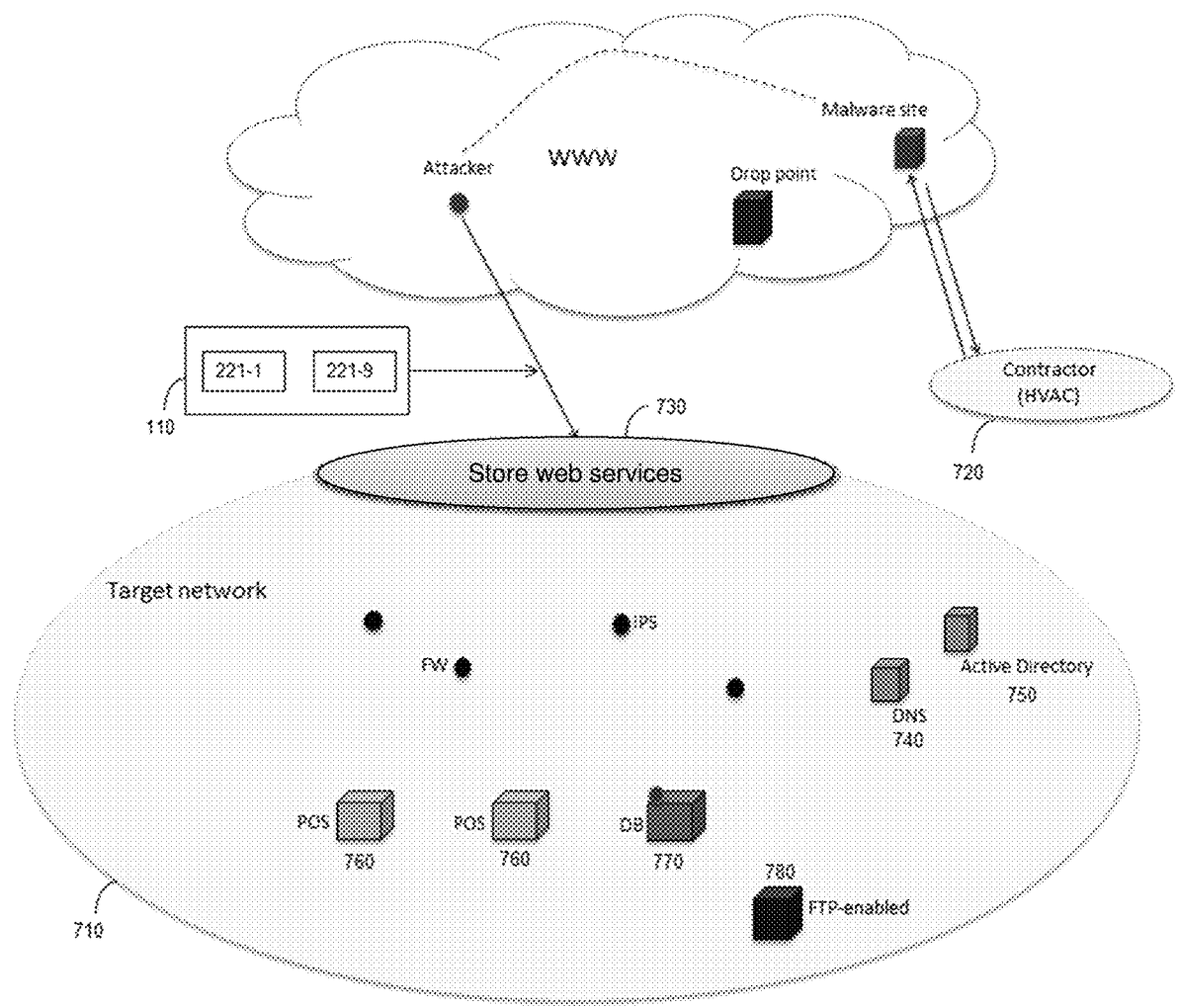

FIG. 8 refers to the intrusion second stage of the attack during which a retail store web services intrusion has occurred. The attacker uses the contractor's stolen credentials to gain access into the retail store's web hosted web services 730. These web services 730 are dedicated to the retail store's partners. In this case, the contractor 720 is a partner having access to some electronic billing, contracting submission, and project management services.

The attacker uses the stolen credentials in order to gain access from the Internet into the web services 730 and then exploit web service vulnerabilities. Such vulnerabilities allow the attacker to execute code (scripts) on the retail store's web applications. This operation allows the attacker to executable OS commands of the web service host.

This can be summarized as the intrusion stage, in which the attacker gains credentials and access to certain levels of the retail store's hosts. It should be noted that until this step, the only unusual activity (from the retail store network perspective) is an upload of an executable file into the retail store's web services 730. These web services 730 are typically supposed to receive only forms, at least from certain partners.

The intrusion stage can be detected by the UNABA security service 221-1 and WAF security service 221-9. The UNABA security service 221-1 would detect unusual upload behavior to web services and the security application 211 would correlate that with WAF logs provided by the WAF security service 221-9 that indicate possible "injection"/"web intrusion" activity. The UNABA security service 221-1 would include a profile of each partner (e.g., contractor) with access to the retail store's network 710. Abnormal upload activity would be detected based on data symmetry parameters, the source geographical location, and activity time (as an example, others parameters may use). The UNABA security service 221-1 would operate on data collected, for example, by DPIs connected at edge routers of the retail store's network 710. The security application 211 can include a correlation rule that correlates between triggered events, such as abnormal user activity of certain type (e.g., the abnormal upload activity) and a WAF log of certain type that represent a code injection.

Figure 9:
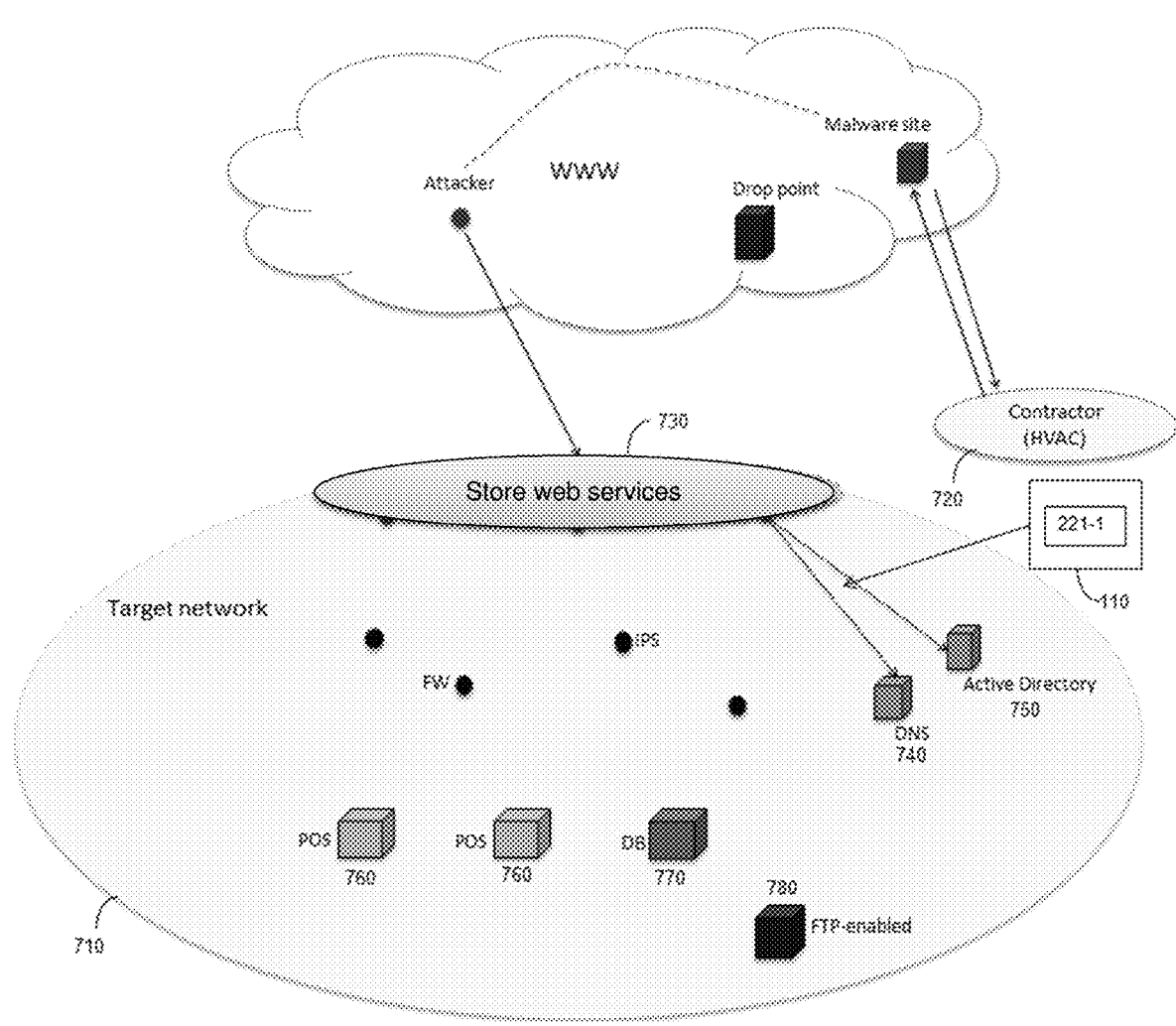

FIG. 9 refers to intelligence gathering and the identification of targets by the APT attacker. Once the attacker can run operating system commands on a host of the web services, the attacker can start generating intelligence gathering operations (also known as "pre-attack probes"). These operations, which can be done manually or automatically through attack tools, allow the attacker to gather information about the retail store's network 710, and thus find the relevant targets for the next steps in the attack life cycle.

Targets in the retail store are services that maintain credit cards and/or social security numbers information. Such services can include databases 770 and point of sales machines 760. Once the attacker identifies the services' names that may maintain credit cards information, and the likes, the attacker queries the DNS 750 to retrieve the IP addresses of such servers (again, this can be done automatically or manually).

The UNABA security service 221-1 can detect the gathering of information by identifying unexpected hosts' traffic activities and anomaly protocol usage (e.g., abnormal LDAP query rates per host, abnormal DNS resolve rates per host, abnormal amount and rate of protocol error response per host and server, new and unexpected application flows that are generated by the host), Such anomalies can be detected by the security decision engines executed by the UNABA security service 221-1. The SDEs can be dynamically programmed by a set of engine rules.

Figure 10:
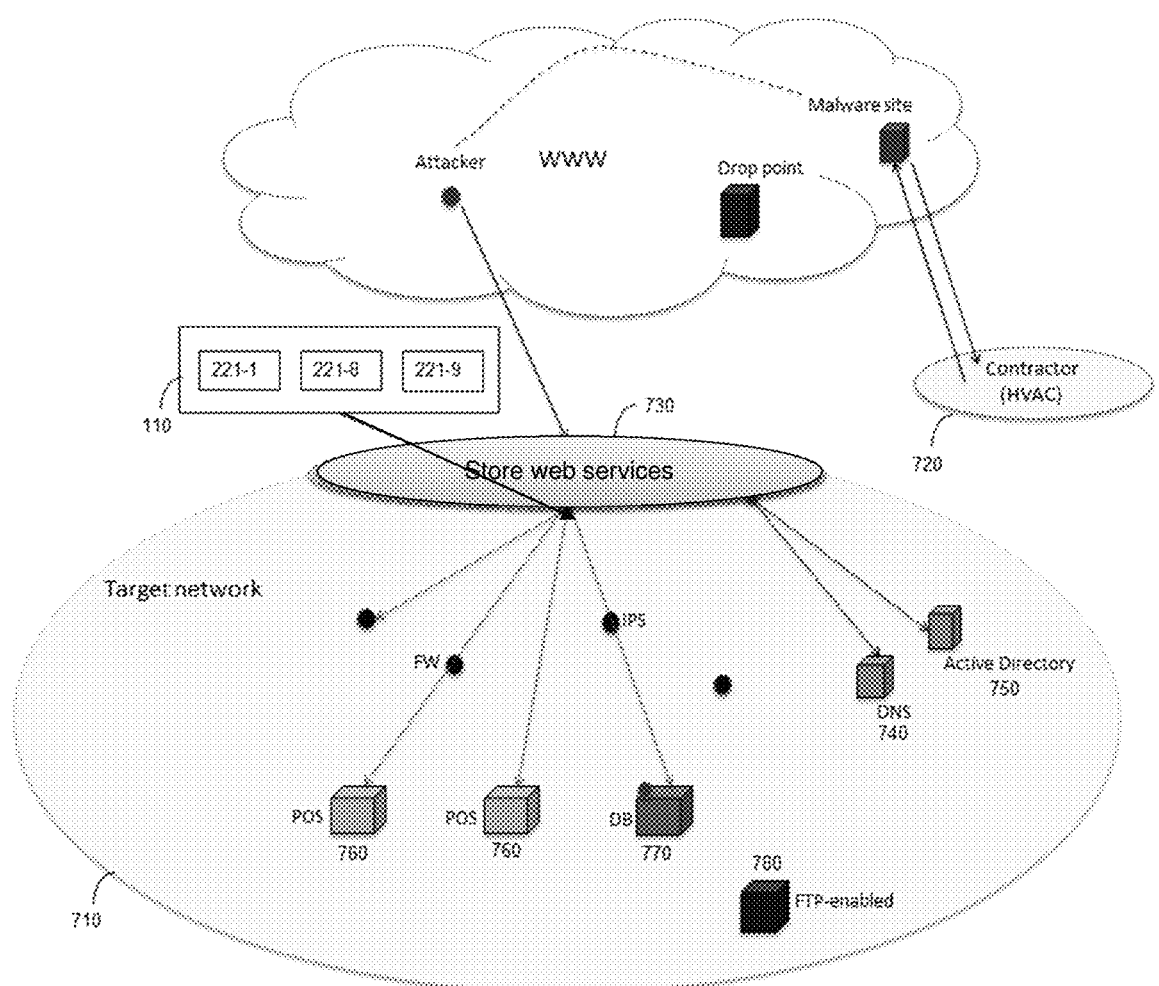

FIG. 10 describes the stage of installing processes. After finding the PoS service names 760 and DB service names 770, the attacker needs to propagate processes into the network elements that can access these services and then take control and install other processes that can steal and send out the credit cards information. In order to propagate and install processes in the retail store's network 710, the attacker operates to get hold of the domain administrative privileges (e.g., within a Microsoft® network) using "pass-the-hash" attack techniques. The pass-the-hash attack allows the attacker to steal a token that resides inside the hosts' memory (that an administrator has used), which represents the password of the administrator (called NT hash). Using the stolen NT hash, the attacker creates an active directory (AD) 740 new user accounts with administrator privileges.

Now, the attacker has privileges to access and install processes on different network elements. At this stage, in order to find the target IPs in the network 710 and identify security defenses such as firewalls, intrusion prevention system, and so on that are protecting them, the attacker uses network scanners such as "Angry IP Scanner", NMAP, and the likes. A scanner is used in order to find which computers are accessible from the current web servers.

In order to bypass detected firewalls rules that block access to some network element or server, the attacker utilizes tools that can tunnel through the firewalls (e.g., port forwarding IT tools that utilize traffic encapsulation techniques, etc.) and then executes new processes on the target hosts, or on hosts that can access these targets.

To detect such network scanning activity, the UNABA security service 221-1 would detect abnormal wide connection distribution with abnormal portion of connection that are non-complete (in this attack case, all are originated by the compromised web services hosts. In addition, an anti-virus security service 221-8 can be activated (by the security application) to scan the web services hosts and look for evidence of installed scanning tools. According to the disclosed embodiments, the security application 211 correlates events that are triggered due to network scanning activities from 221-1 and events from the anti-virus detection services.

Figure 11:
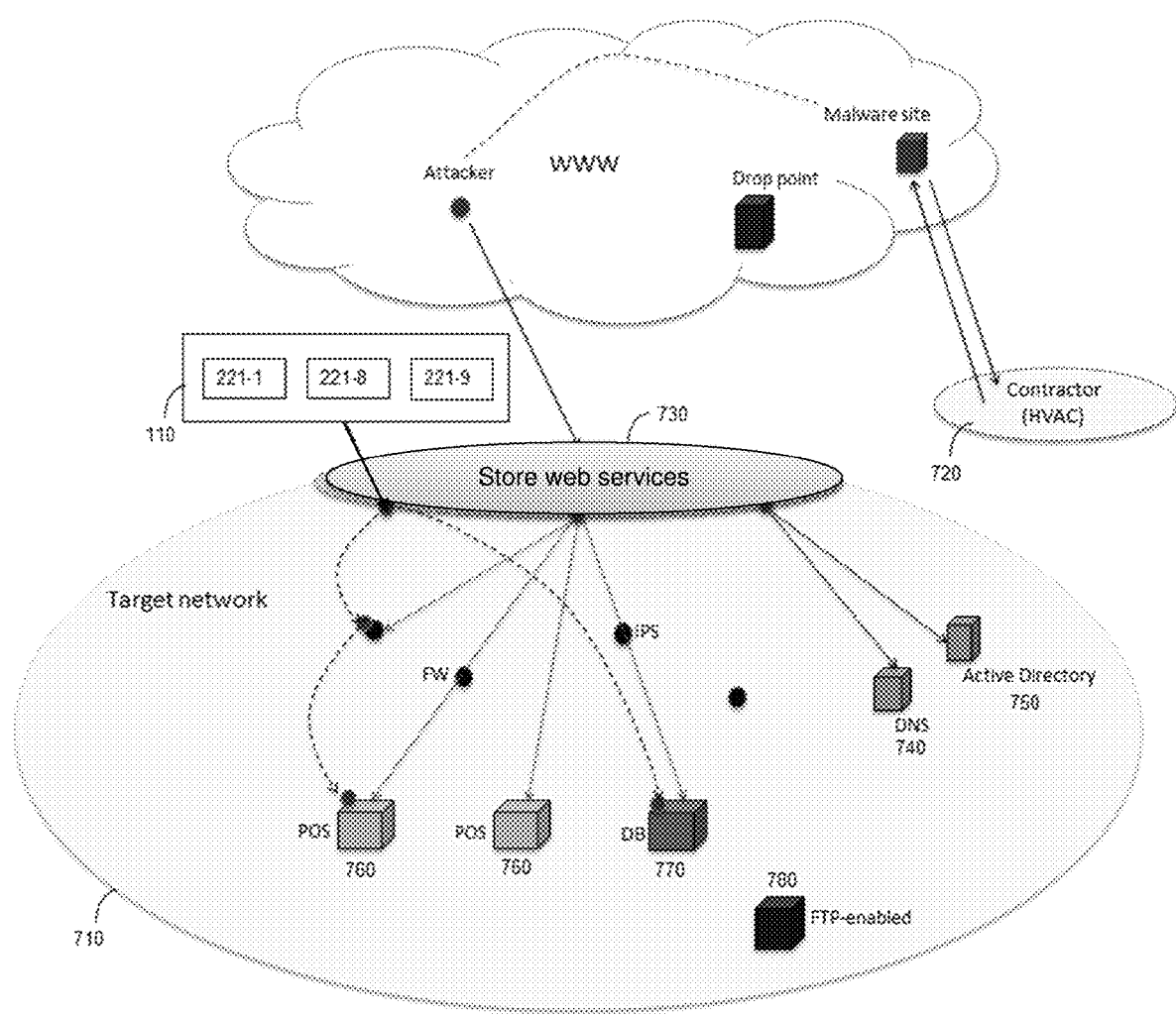

FIG. 11 describes the penetration and control stage. At this stage the attacker installs new processes on the target servers hosts or hosts that have access to these targets. With this aim, the attacker can use different types of remote desktop, processes execution tools, and the administrator credentials, remote desktop tools (e.g., a RDP and a PsExec). Using these remote tools and administrator credentials, the attacker is able to run scripts on the DB services 770 and install malware on the PoS servers 760.

For collecting the credit cards and personal information (such as social security numbers) from the target services, the attacker uses MS SQL query tools. In order to search and steal information from the PoS machines 760 directly, the attacker uses the 'kaptoxa' malware on all PoS machines 760. The attacker installs the malware using the tools mentioned herein above. The malware scans (scrapes) the memory of the PoS 760 and when the malware identifies a credit card pattern it opens a communication socket and sends the credit card pattern to an internal drop zone. It should be noted that in the case of the PoS machine 760, the malware must quickly send the credit card information before such information is removed from the RAM of the PoS. As long as the information resides in the RAM it is usually in its un-encrypted form, therefore sending it directly from the RAM insures easy visibility into the card numbers.

To detect such malicious activity, the UNABA security service 221-1 is configured to identify unusual usage of remote-desktop and remote process execution tools, such as Telnet, RDP, VNC, PuTTY, in the network 110. SDEs in the UNABA security service 221-1 identify activities, such as hosts that are generating traffic associated with such tools to destination hosts. In a normal network behavior, such hosts typically do not communicate with remote desktop applications. The SDEs can also identify, for example, if the usage pattern of these remote-desktop or application deviates from the usual pattern.

In addition, based on the signals received from the UNABA security service 221-1, the security application 211 can instruct the anti-virus security service 221-8 to scan the target hosts of which the detected remote-desktop and remote processes tools are communicating with (e.g., PoS and DB services hosts) and to search for malware related evidences (e.g., PoS related malware such as the Kaptoxa malware). The security application 211 correlates (according to the correlation and workflow rules) the security events from received from the security services 221-1 and 221-9 in order to decide about the next actions.

Figure 12:
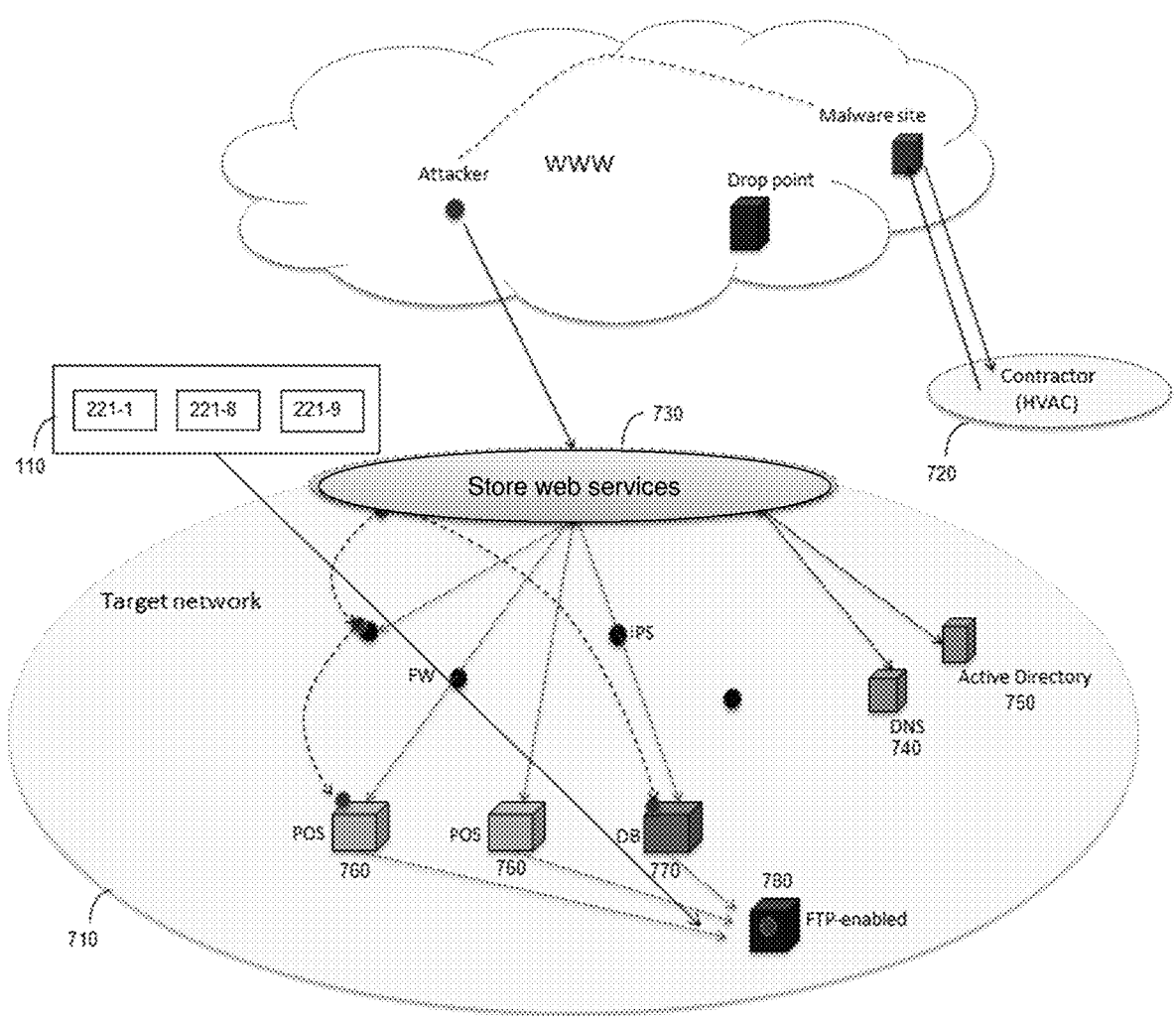

FIG. 12 refers to the collecting stolen information stage. At this stage the attacker creates a file share service 780 on a remote server inside the target network (this is typically done also by a remote desktop application that the attacker will use with its credential to enable services). The malware, on PoS 760, scrapes the RAM memory of the host, identifies credit-cards' number patterns and send these numbers to file share server using the SMB protocols (this last activity is defined as an internal drop zone activity).

To detect such malicious activity, the UNABA security service 221-1 would identify the abnormal remote desktop that enables the file share service, as well as the internal drop zone activity.

In addition, the UNABA security service 221-1 identifies the internal drop zone activity by a SDE that analyzes the connection distribution, the L7 protocol distribution, as well as the traffic symmetry. In the case of drop zone, an abnormal narrow connection distribution (multiple hosts that communicate with a single host), with an abnormal narrow L7 protocol distribution (abnormal common protocol), as well as abnormal upload traffic symmetry would result with high SoA generated by this SDE.

Figure 13:
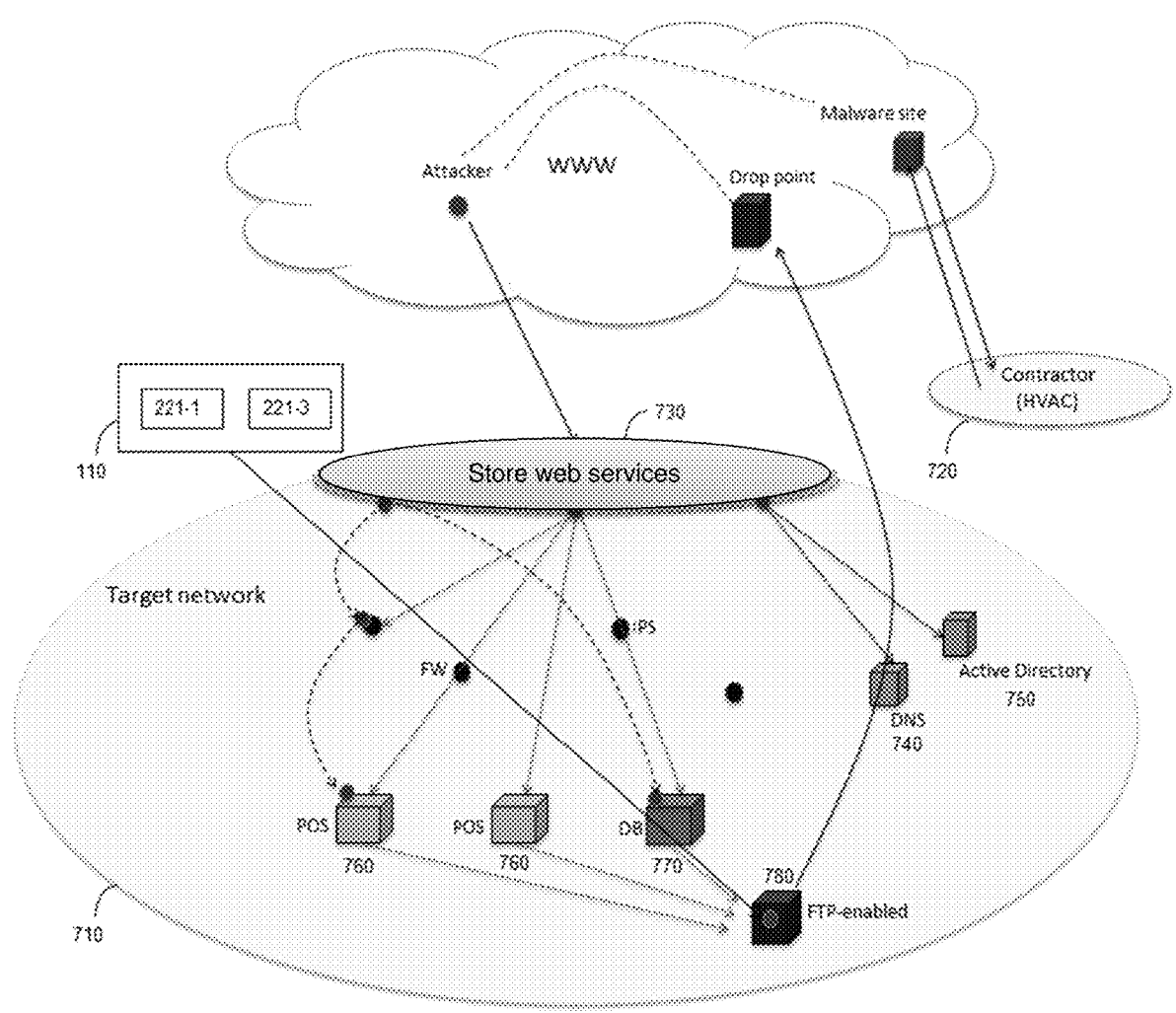

FIG. 13 refers to the stage of sending out stolen credit cards' information. Once such information arrives to the file share server, which is also an FTP enabled machine 780, a script on the machine sends the file to the attacker's controlled FTP account (an external host), using an internal FTP client.

To detect such malicious activity, the UNABA and reputation security services 221-1 and 221-3 are utilized. The UNABA security service 221-1 would identify the unusual source and destination with an upload behavior activity, periodic upload behavior during unusual hours of operation, and a source with a new protocol usage (not limited by these parameters). Then the security application 211 will instruct the reputation security service 221-3 to provide intelligence information about the external destination IP address. The security application 211 correlates the signals from the security services 221-1 and 221-3 generate an action according to the correlation and workflow rules (e.g., in case the external IP has high bad reputation score, which is associated with known public drop points then the action will be to block this traffic through the mitigation phase services).

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for adaptively securing a protected entity against a potential advanced persistent threat (APT), comprising:
   probing a plurality of resources, including hosts, in a network prone to be exploited by an APT attacker for APT-related activity;
   operating at least one security service configured to output signals indicative of APT related activity of each of the plurality of probed resources, wherein the at least one security service is an application behavior anomaly (UNABA) security service, and wherein operating the UNABA security service further comprises detecting APT related activity exploiting legitimate users in the network, wherein the APT attacker pretends normal behavior of the users;
   generating at least one security event based on the output signals;
   determining if the at least one security event satisfies at least one workflow rule;
   upon determining that the at least one security event satisfies the at least one workflow rule, generating at least one action with respect to the potential APT attack;
   maintaining a profile for each host, wherein the profile includes adaptive and real-time baseline parameters for the host's activity over a period of predefined time;
   computing, using a plurality of security decision engines, signals of anomaly (SoA) based on the probed APT related activity, the baseline parameters and a set of engine rules, wherein a SoA signal is output by the UNABA security service;
   correlating signals provided by other services with the computed SoA; and
   outputting the correlated signal.

2. The method of claim 1, wherein the plurality of resources are active resources.

3. The method of claim 2, wherein each of the plurality of active resources are executing for providing at least one respective service.

4. The method of claim 1, wherein the APT related activity includes at least one of: abnormal usage and abnormal operation of each of the plurality of probed resources.

5. The method of claim 4, wherein the APT related activity includes at least one of: scanning, malware propagation, remote desktop communication channels, processes performed in installation channels, brute-force attacks, protocol usage patterns representing fake applications, and drop-zone traffic representing data leaks.

6. The method of claim 4, wherein APT related activity of each of the plurality of probed resources is analyzed by a plurality of security services.

7. The method of claim 1, wherein the at least one workflow rule applies a set of logical operators on the at least one security event to generate the at least one action.

8. The method of claim 1, wherein generating the at least one security event based on the output signals further comprises:
   determining if the output signals satisfy at least one event rule; and
   upon determining that the output signals satisfy the at least one event rule, generating the at least one security event.

9. The method of claim 8, wherein the at least one event rule evaluates at least one of: a signal value, a signal duration, and a signal frequency.

10. The method of claim 1, further comprising:
    programming each of the plurality of security decision engines to evaluate or detect user behavioral anomalies caused due to APT related activity.

11. The method of claim 1, wherein the at least one action includes activating additional security services to perform any one of: a mitigation action, an investigation action, a detection action.

12. A non-transitory computer readable medium having stored thereon instructions for causing processing circuitry to execute a process for adaptively securing a protected entity against a potential advanced persistent threat (APT), the process comprising:
    probing a plurality of resources, including hosts, in a network prone to be exploited by an APT attacker for APT-related activity;
    operating at least one security service configured to output signals indicative of APT related activity of each of the plurality of probed resources, wherein the at least one security service is an application behavior anomaly (UNABA) security service, and wherein operating the UNABA security service further comprises detecting APT related activity exploiting legitimate users in the network, wherein the APT attacker pretends normal behavior of the users;

generating at least one security event based on the output signals;

determining if the at least one security event satisfies at least one workflow rule;

upon determining that the at least one security event satisfies the at least one workflow rule, generating at least one action with respect to the potential APT attack;

maintaining a profile for each host, wherein the profile includes adaptive and real-time baseline parameters for the host's activity over a period of predefined time;

computing, using a plurality of security decision engines, signals of anomaly (SoA) based on the probed APT related activity, the baseline parameters and a set of engine rules, wherein a SoA signal is output by the UNABA security service;

correlating signals provided by other services with the computed SoA; and outputting the correlated signal.

13. A system for adaptively securing a protected entity against a potential advanced persistent threat (APT), comprising:

a processor; and a memory, the memory containing instructions that, when executed by the processor, configure the system to:

probe a plurality of resources, including hosts, in a network prone to be exploited by an APT attacker for APT-related activity;

operate at least one security service configured to output signals indicative of APT related activity of each of the plurality of probed resources, wherein the at least one security service is an application behavior anomaly (UNABA) security service, and wherein operating the UNABA security service further comprises detecting APT related activity exploiting legitimate users in the network, wherein the APT attacker pretends normal behavior of the users;

generate at least one security event based on the output signals;

determine if the at least one security event satisfies at least one workflow rule;

generate at least one action with respect to the potential APT attack, upon determining that the at least one security event satisfies the at least one workflow rule;

maintain a profile for each host, wherein the profile includes adaptive and real-time baseline parameters for the host's activity over a period of predefined time;

compute, using a plurality of security decision engines, signals of anomaly (SoA) based on the probed APT related activity, the baseline parameters and a set of engine rules, wherein a SoA signal is output by the UNABA security service;

correlate signals provided by other services with the computed SoA; and output the correlated signal.

14. The system of claim 13, wherein the plurality of resources are active resources.

15. The system of claim 14, wherein each of the plurality of active resources are executing for providing at least one respective service.

16. The system of claim 13, wherein the APT related activity includes at least one of: abnormal usage and abnormal operation of each of the plurality of probed resources.

17. The system of claim 16, wherein the APT related activity includes at least one of: scanning, malware propagation, remote desktop communication channels, processes performed in installation channels, brute-force attacks, protocol usage patterns representing fake applications, and drop-zone traffic representing data leaks.

18. The system of claim 16, wherein APT related activity of each of the plurality of probed resources is analyzed by a plurality of security services.

19. The system of claim 13, wherein the at least one workflow rule applies a set of logical operators on the at least one security event to generate the at least one action.

20. The system of claim 13, wherein the system is further configured to:

determine if the output signals satisfy at least one event rule; and generate the at least one security event, upon determining that the output signals satisfy the at least one event rule.

21. The system of claim 20, wherein the at least one event rule evaluates at least one of: a signal value, a signal duration, and a signal frequency.

22. The system of claim 13, wherein the system is further configured to:

program each of the plurality of security decision engines to evaluate or detect user behavioral anomalies caused due to APT related activity.

23. The system of claim 13, wherein the at least one action includes activating additional security services to perform any one of: a mitigation action, an investigation action, a detection action.

* * * * *